United States Patent
Kinoshita (10) Patent No.: US 7,532,825 B2
(45) Date of Patent: May 12, 2009

(54) OPTICAL RECEIVER

(75) Inventor: Keisuke Kinoshita, Katano (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 11/311,306

(22) Filed: Dec. 20, 2005

(65) Prior Publication Data

US 2006/0133825 A1 Jun. 22, 2006

(30) Foreign Application Priority Data

Dec. 21, 2004 (JP) .............................. 2004-368782

(51) Int. Cl.
*H04B 10/06* (2006.01)
(52) U.S. Cl. .................................................. 398/202
(58) Field of Classification Search .................. 398/118, 398/119, 120, 128, 129, 130, 131, 202
See application file for complete search history.

(56) References Cited

U.S. PATENT DOCUMENTS

| | | | |
|---|---|---|---|
| 6,122,084 A * | 9/2000 | Britz et al. .................. | 398/131 |
| 6,243,182 B1 * | 6/2001 | Wang .......................... | 398/119 |
| 6,398,425 B2 * | 6/2002 | Williams et al. .............. | 385/89 |
| 7,058,316 B2 * | 6/2006 | Vilnrotter et al. ........... | 398/202 |
| 2002/0093714 A1 * | 7/2002 | Tokita et al. ................. | 359/187 |
| 2002/0131121 A1 * | 9/2002 | Jeganathan et al. ......... | 359/152 |
| 2003/0118345 A1 * | 6/2003 | Tomizawa et al. ........... | 398/140 |

FOREIGN PATENT DOCUMENTS

JP  5-183513  7/1993

* cited by examiner

*Primary Examiner*—Leslie Pascal
(74) *Attorney, Agent, or Firm*—Wenderoth, Lind & Ponack, L.L.P.

(57) ABSTRACT

An optical signal emitted from an optical transmitter is received and converted into electrical signals by a plurality of photodetectors individually. A plurality of amplifiers individually amplify the electrical signals converted by the respective corresponding photodetectors. A plurality of identification sections individually identify multivalued digital data of the optical signal based on the amplified electrical signals output by the respective corresponding amplifiers. A determination section examines all of a plurality of pieces of digital data output by the plurality of identification sections to determine digital data which is to be output from the optical receiver.

6 Claims, 10 Drawing Sheets

(TOP SIDE)  (BOTTOM SIDE)

OPTICAL RECEIVER

BACKGROUND OF THE INVENTION

1. Field of the Invention

The present invention relates to an optical receiver which performs data communication using an optical signal.

2. Description of the Background Art

As conventional optical transmission systems, there are optical fiber transmission in which an optical signal is transmitted through an optical fiber, optical wireless transmission in which an optical signal is transmitted through free space without using an optical fiber, and the like. Concerning an optical receiver for use in these optical transmission systems, it is a challenge to improve the efficiency of a photodetector (PD) which receives an optical signal from a transmitter. Particularly in the case of optical wireless transmission, it is necessary to couple an optical signal output from an optical transmitter with the photodetector of an optical receiver by accurately aligning optical axes of the optical transmitter and the optical receiver and suppressing spread of an optical beam using a lens or the like.

A method for optical axis alignment has been proposed in Japanese Patent Laid-Open Publication No. H05-183513, in which an optical signal for optical axis alignment is transmitted apart from an optical signal containing a data signal. Optical axis alignment is performed in advance, and after the optical axis alignment the optical signal containing a data signal is transmitted so that optical wireless transmission is achieved.

In the above-described conventional method in which optical axis alignment is performed in advance, it is necessary to narrow the diameter of an optical beam emitted from an optical transmitter in order to improve the coupling efficiency between an optical signal and a photodetector. However, it is technically difficult to narrow the optical beam diameter to a level which effectively enhances the coupling efficiency. In addition, even when an optical beam is narrowed under a certain positional relationship, the coupling efficiency is reduced if the positional relationship is lost. Therefore, the method of narrowing the optical beam diameter is not very practical.

Figure 10A:
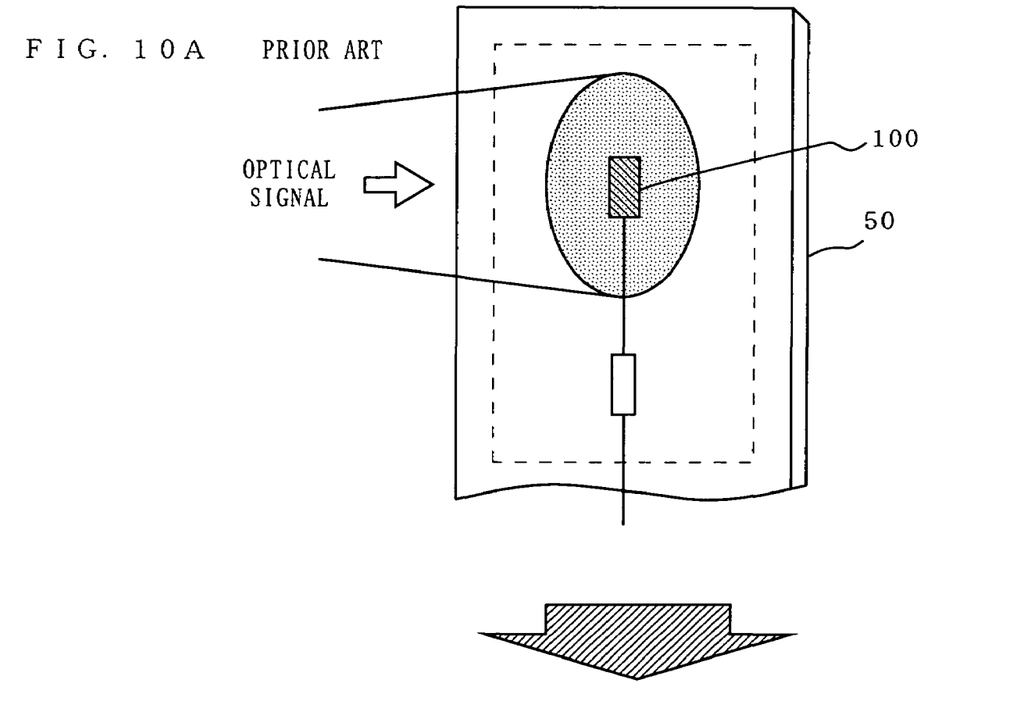
FIG. 10A and FIG. 10B are diagrams for explaining problems with conventional optical receivers.
Figure 10B:
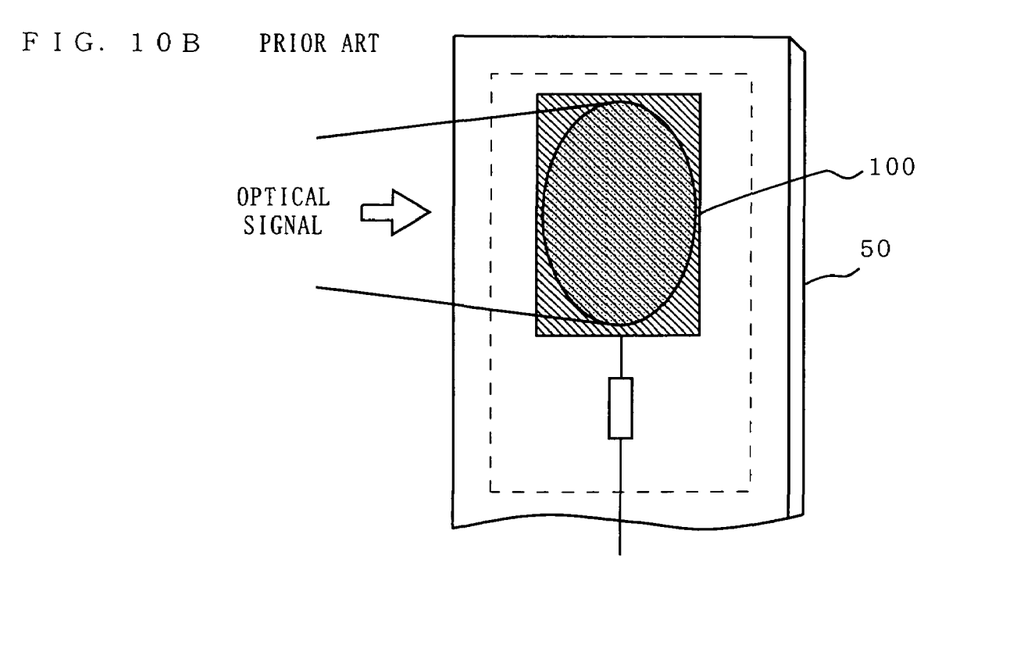

Therefore, when the optical beam diameter is large, the coupling efficiency cannot be improved unless a photodetector 100 has a large light receiving diameter as illustrated in (b) of FIG. 10. However, as the light receiving diameter of the photodetector 100 is increased, the capacitance of the photodetector 100 increases. As a result, the frequency response characteristics are deteriorated, so that the transmission rate of a data signal is limited (the transmission rate is slowed).

In order to take measures against the case where the optical beam diameter is large, a plurality of photodetectors having a small light receiving diameter may be used, and signals obtained by the plurality of photodetectors are preamplified, and thereafter added. However, in such an analog technique, the sum signal after preamplification has a large amplitude, and a subsequent circuit needs to have a considerably large dynamic range. Also, since the sum signal has a large amplitude, the optical receiver has large power consumption.

SUMMARY OF THE INVENTION

Therefore, an object of the present invention is an optical receiver which has an improved level of coupling efficiency and reception performance without a deterioration in the frequency response characteristics of a photodetector.

The present invention is directed to an optical receiver which performs data communication using an optical signal. In order to achieve the above-described object, the optical receiver of the present invention comprises a plurality of photodetectors, a plurality of amplifiers, a plurality of identification sections, and a determination section. The plurality of photodetectors receive an optical signal. The plurality of amplifiers are provided corresponding to the plurality of photodetectors, and amplify signals output from the respective photodetectors. The plurality of identification sections are provided corresponding to the plurality of amplifiers, and identify digital data of the optical signal based on signals output from the respective amplifiers. The determination section receives a plurality of pieces of identified digital data output from the plurality of identification sections, and based on the plurality of pieces of identified digital data, determines digital data which is to be output.

Preferably, the determination section determines, as the digital data to be output, digital data which is most frequently identified among the plurality of pieces of identified digital data. Typically, the plurality of identification sections identify binary digital data.

The optical receiver of the present invention may further comprise a plurality of detection sections which are provided corresponding to the plurality of amplifiers and detect amplitude levels output from the respective amplifiers. In this case, the determination section can weight the plurality of pieces of identified digital data, depending on the amplitude levels detected by the detection sections, and perform a determination process. Alternatively, the determination section can perform a determination process using only identified digital data for which the amplitude level detected by the detection section is larger than a critical value.

Also, the identification section may stop outputting of digital data to the determination section when an amplitude of a signal output from the amplifier is smaller than a critical value, and the determination section may perform a determination process using only identified digital data which is output from the identification section. In this case, the identification section can further stop operations of the corresponding photodetector and amplifier.

The optical receiver of the present invention may further comprise a received light power detecting section for detecting a received light power of the photodetector, and a photodetector current output switching section for stopping outputting of the photodetector to the amplifier when the received light power detected by the received light power detecting section is smaller than a critical value. In this case, the photodetector current output switching section can further stop operations of the corresponding amplifier and identification section.

According to the present invention, the coupling efficiency and reception performance of an optical receiver can be improved without a deterioration in the frequency response characteristics of a photodetector.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the accompanying drawings.

First Embodiment

Figure 1:
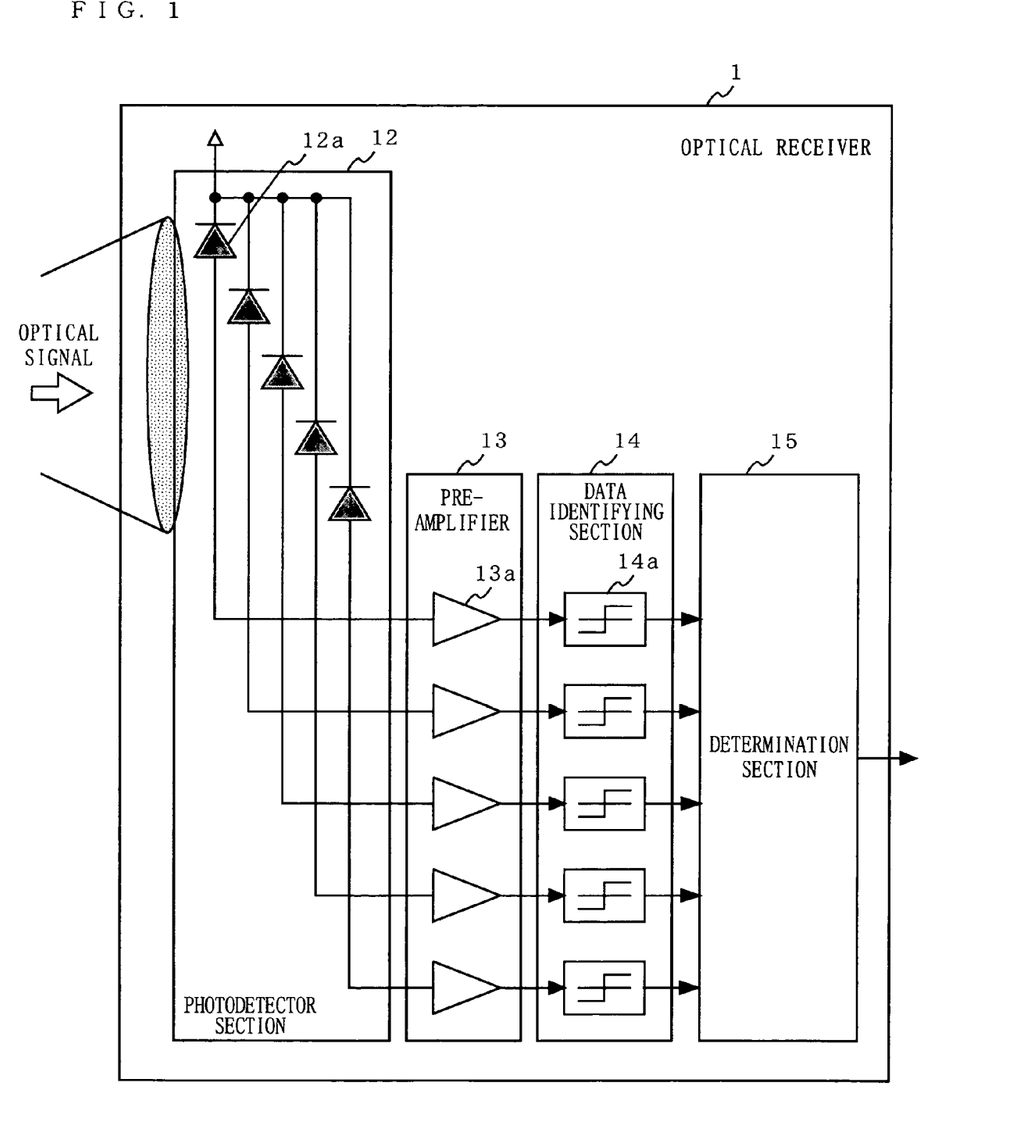
FIG. 1 is a block diagram illustrating a structure of an optical receiver 1 according to a first embodiment of the present invention.

FIG. 1 is a block diagram illustrating a structure of an optical receiver 1 according to a first embodiment of the present invention. In FIG. 1, the optical receiver 1 of the first embodiment comprises a photodetector section 12, a pre-amplifier 13, a data identifying section 14, and a determination section 15.

An optical signal emitted from an optical transmitter (not shown) is received by the photodetector section 12, which in turn performs photoelectric conversion. The photodetector section 12 is composed of a plurality of photodetectors (PD) 12a. The photodetectors 12a individually receive and convert an optical signal into an electrical signal. Each photodetector 12a has a light receiving area which provides sufficient frequency response characteristics for a transmission rate of an optical signal. The coupling efficiency of the photodetector 12a can be increased by increasing the light receiving diameter of the photodetector 12a. However, as described in the Description of the Background Art section, the frequency response characteristics are deteriorated with an increase in the light receiving diameter. Therefore, in the present invention, the plurality of photodetectors 12a are employed. In FIG. 1, as an example, the photodetector section 12 is composed of five photodetectors 12a.

The pre-amplifier 13 comprises a plurality of amplifiers 13a corresponding to the plurality of photodetectors 12a of the photodetector section 12 so that the electrical signals converted by the photodetectors 12a are amplified individually.

The data identifying section 14 comprises a plurality of identification sections 14a corresponding to the plurality of the amplifiers 13a of the pre-amplifier 13. The plurality of identification sections 14a individually identify multivalued digital data of the optical signal based on amplified electrical signals output from the respective amplifiers 13a. For example, when binary digital data is identified in the data identifying section 14, a critical value may be previously stored in each identification section 14a, and the digital data may be identified as "1" if the amplified electrical signal exceeds the critical value, and if not, as "0".

The determination section 15 examines all of a plurality of pieces of digital data output from the plurality of identification sections 14a of the data identifying section 14 to determine digital data which is to be output from the optical receiver 1. Typically, the determination method is performed by the determination section 15 as follows. Among the plurality of pieces of digital data output from the plurality of identification sections 14a, the digital data the number of which is largest is determined as the one which is to be output from the optical receiver 1. For example, when five identification sections 14a output a plurality of pieces of digital data "1, 1, 0, 0, 1", the data "1" the number of which is the largest, is determined as the digital data to be output.

In this case, the plurality of amplifiers 13a of the pre-amplifier 13 independently generate noise. Therefore, even if the amplifiers 13a have the same bit error rate characteristics with respect to received light power, bit errors occur independently where attention is paid to any specific time. It is here assumed that the photodetectors 12a of the photodetector section 12 have the same received light power, and the $(2n+1)$ amplifiers 13a included in the pre-amplifier 13 have the same bit error rate, which is represented by "Pe1". In this case, the optical receiver 1 has a bit error rate Pe, which is represented by expression (1) below. Note that, in expression (1), noise occurring in each amplifier is dominant compared to noise present in a received optical signal.

$$Pe \approx n(2n+1)[Pe1]^{n+1} \tag{1}$$

For example, it is assumed that the number of amplifiers 13a is 5 ($n=2$) as in the optical receiver 1 of FIG. 1. The bit error rate Pe of the optical receiver 1 where $n=2$, is calculated as follows:

$$\begin{aligned}
Pe &= Pe1 \times Pe1 \times Pe1 \times Pe1 \times (1-Pe1) + Pe1 \times Pe1 \times Pe1 \times \\
&\quad (1-Pe1) \times Pe1 + Pe1 \times Pe1 \times (1-Pe1) \times Pe1 \times Pe1 + \\
&\quad Pe1 + Pe1 \times (1-Pe1) \times Pe1 \times Pe1 \times Pe1 + (1-Pe1) \times Pe1 \times \\
&\quad Pe1 \times Pe1 \times Pe1 + Pe1 \times Pe1 \times Pe1 \times (1-Pe1) \times (1-Pe1) + \\
&\quad Pe1 \times Pe1 \times (1-Pe1) \times Pe1 \times (1-Pe1) + Pe1 \times (1-Pe1) \times \\
&\quad Pe1 \times Pe1 \times (1-Pe1) + (1-Pe1) \times Pe1 \times Pe1 \times Pe1 \times \\
&\quad (1-Pe1) + Pe1 \times Pe1 \times (1-Pe1) \times (1-Pe1) \times Pe1 + \\
&\quad Pe1 \times (1-Pe1) \times Pe1 \times (1-Pe1) \times Pe1 + (1-Pe1) \times \\
&\quad Pe1 \times Pe1 \times (1-Pe1) \times Pe1 + Pe1 \times (1-Pe1) \times (1-Pe1) \times \\
&\quad Pe1 \times Pe1 + (1-Pe1) \times Pe1 \times (1-Pe1) \times Pe1 \times Pe1 + \\
&\quad (1-Pe1) \times (1-Pe1) \times Pe1 \times Pe1 \times Pe1 + Pe1 \times Pe1 \times \\
&\quad Pe1 \times Pe1 \times Pe1 \\
&= 10[Pe1]^3 - 15[Pe1]^4 - 6[Pe1]^5 \\
&\approx 10[Pe1]^3 \text{ (because } [Pe1]^3 \gg [Pe1]^4 \gg [Pe1]^5 \text{).}
\end{aligned}$$

Figure 2:
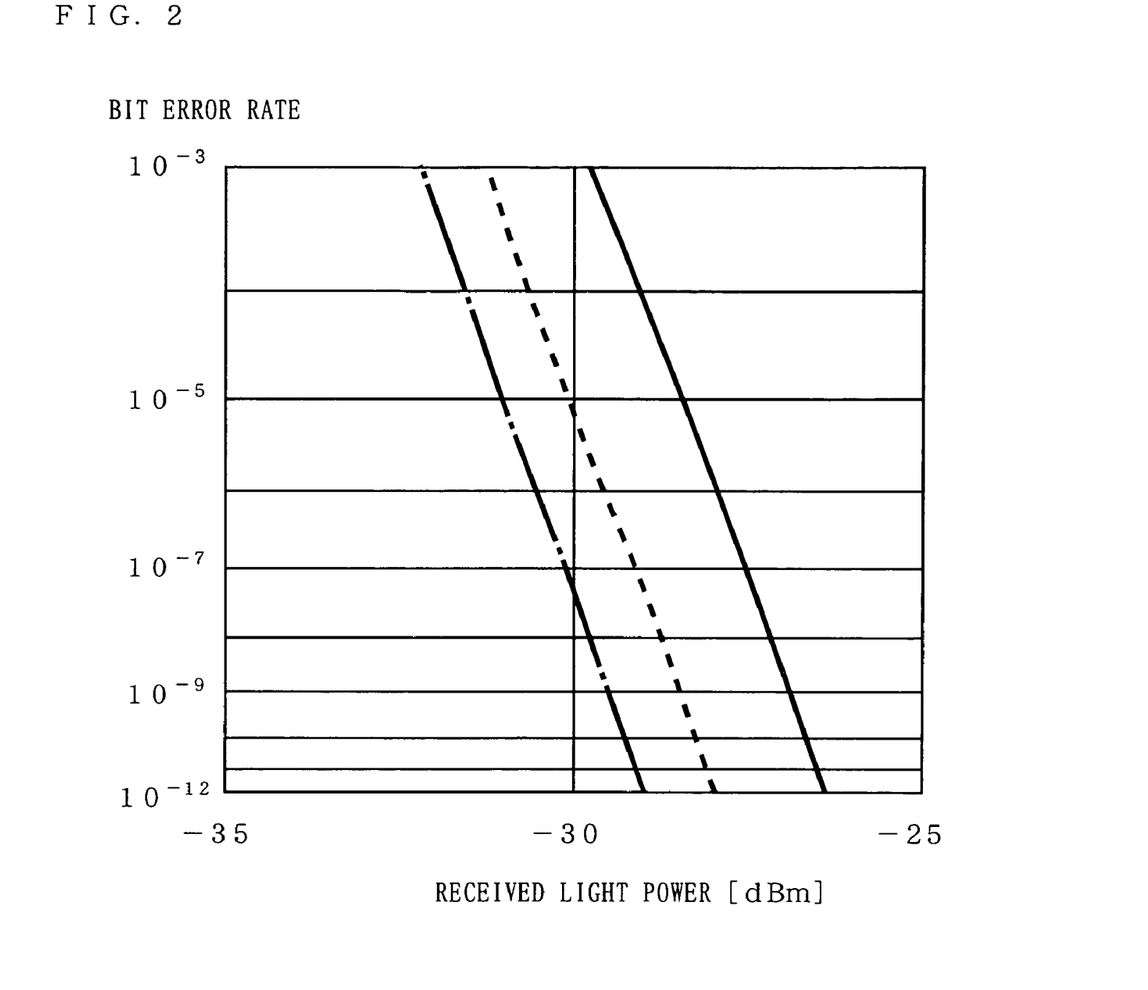
FIG. 2 is a diagram illustrating bit error rate characteristics of the optical receiver 1 of FIG. 1.

It is here assumed that Pe1 is 1E-3. In this case, the bit error rate Pe of the optical receiver 1 is about 1E-8, which means an improvement. Bit error rate characteristics of this case are illustrated in FIG. 2. In FIG. 2, the bit error rate characteristics are indicated with a solid line, a dashed line, and a dash dot line when the number of photodetectors and the number of amplifiers are each 1, 3, and 5, respectively. As can be seen from FIG. 2, a minimum received light power (a received light power when the bit error rate is 1E-12) is improved by about 2 dB and about 3 dB when the numbers of photodetectors and amplifiers are each 3 and 5, respectively.

As described above, according to the optical receiver 1 of the first embodiment of the present invention, the coupling efficiency and the reception performance can be improved without a deterioration in the frequency response characteristics of the photodetector 12a.

Second Embodiment

Figure 3:
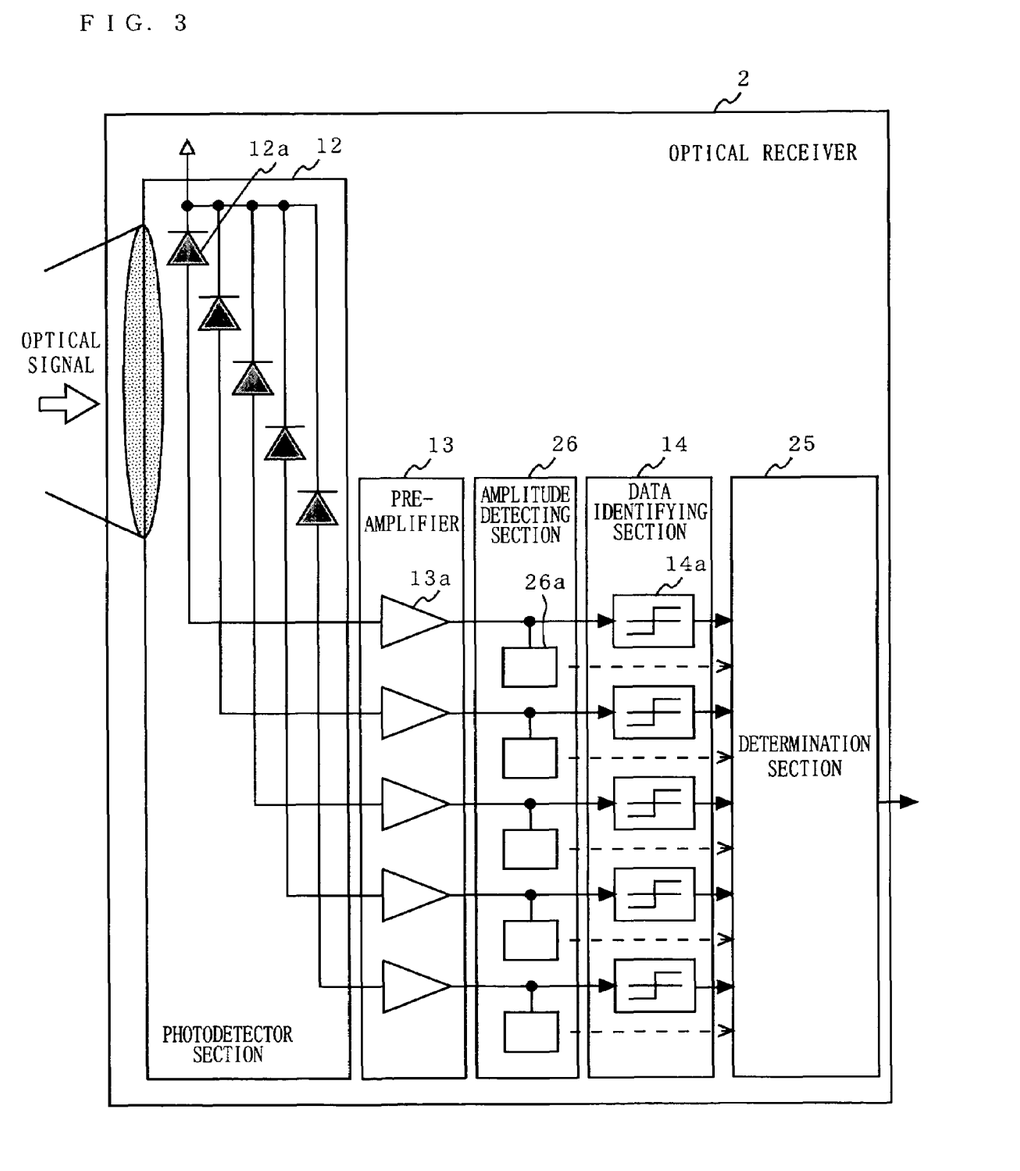
FIG. 3 is a block diagram illustrating a structure of an optical receiver 2 according to a second embodiment of the present invention.

FIG. 3 is a block diagram illustrating a structure of an optical receiver 2 according to a second embodiment of the present invention. In FIG. 3, the optical receiver 2 of the second embodiment comprises a photodetector section 12, a pre-amplifier 13, a data identifying section 14, a determination section 25, and an amplitude detecting section 26.

As illustrated in FIG. 3, the optical receiver 2 of the second embodiment is different from the optical receiver 1 of the first embodiment in that the structures of the determination section 25 and the amplitude detecting section 26. Hereinafter, the same components are indicated with the same reference numerals and will not be explained. The optical receiver 2 of the second embodiment will be described in terms of the different structures.

The amplitude detecting section 26 comprises a plurality of detection sections 26a corresponding to the plurality of amplifiers 13a of the pre-amplifier 13, and detects an amplitude level of an electrical signal output from each amplifier 13a. Information concerning the detected amplitude level is transferred to the determination section 25. The determination section 25 examines a plurality of pieces of digital data output from a plurality of identification sections 14a of the data identifying section 14 while weighting in accordance with the amplitude level information received from the amplitude detecting section 26, to determine digital data which is to be output from the optical receiver 2.

Typically, a weighting coefficient is assigned to each digital data, depending on the amplitude level of an electrical signal (e.g., a large weighting coefficient is assigned to an amplitude level corresponding to a BER (bit error rate)=1E-9, and a small weighting coefficient is assigned to an amplitude level corresponding to a BER=1E-3). A total value of weighting coefficients added for each digital data is examined, and digital data having a largest total value is determined as digital data which is to be output from the optical receiver 2.

Alternatively, only the top several pieces of digital data having a large amplitude level may be examined using a critical value or the like, and digital data the of which is largest may be determined as the one which is to be output from the optical receiver 2. In this case, operations of an amplifier(s) 13a and an identification section(s) 14a which process digital data which has been determined to be invalid data are stopped, thereby making it possible to suppress power consumption. Note that the number of pieces of valid data may be determined based on whether or not the total value of amplitude levels is larger than or equal to a predetermined value (e.g., whether or not the error rate is larger than or equal to an error-free level (1E-12)), but not based on the critical value.

As described above, according to the optical receiver 2 of the second embodiment of the present invention, if the amplitude level of an electrical signal output from the amplifier 13a is large, the reliability of the signal is determined to be high, and a large weight is assigned to the signal. Thereby, the value of digital data received by the photodetector section 12 can be more correctly determined.

Third Embodiment

Figure 4:
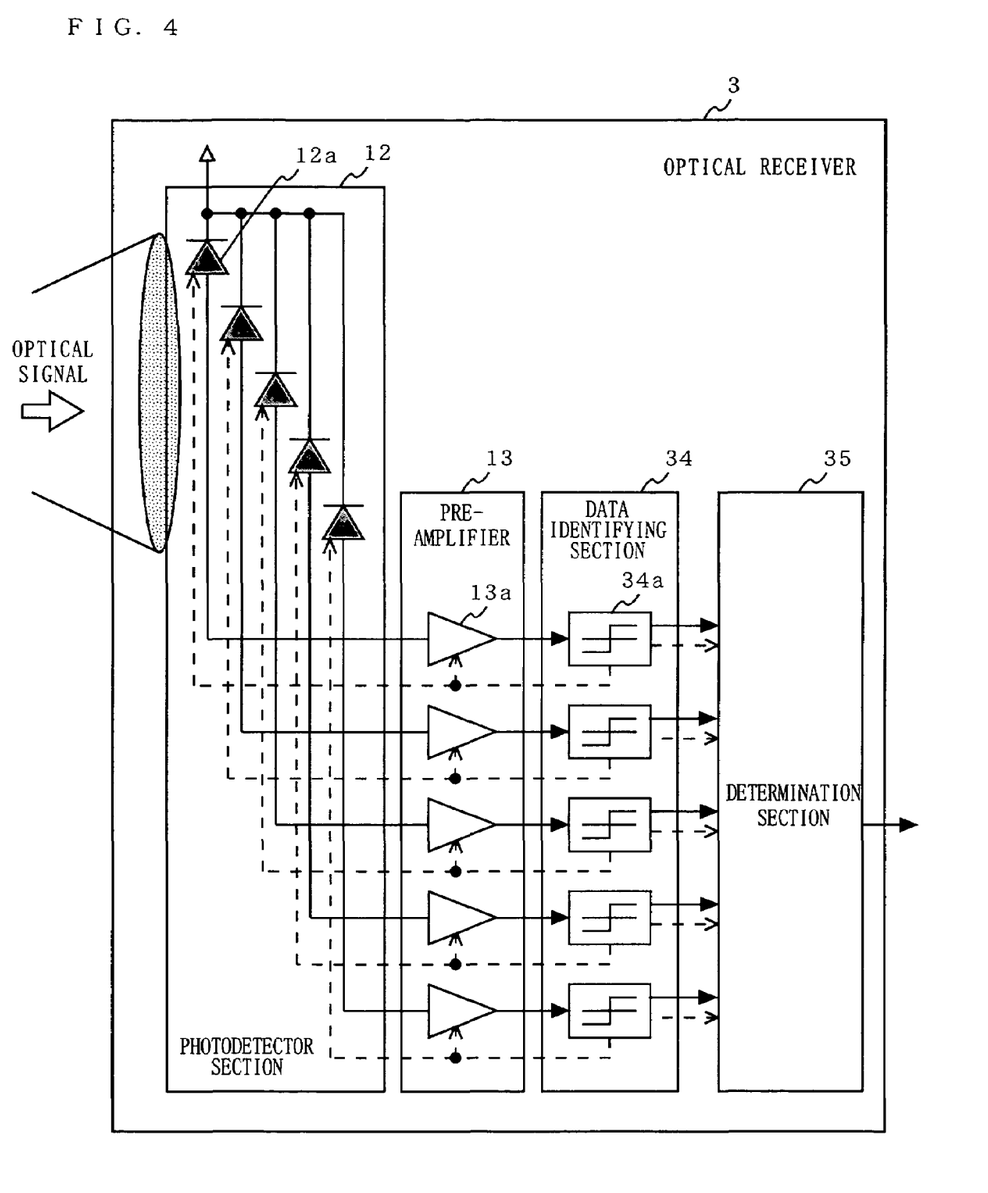
FIG. 4 is a block diagram illustrating a structure of an optical receiver 3 according to a third embodiment of the present invention.

FIG. 4 is a block diagram illustrating a structure of an optical receiver 3 according to a third embodiment of the present invention. In FIG. 4, the optical receiver 3 of the third embodiment comprises a photodetector section 12, a pre-amplifier 13, a data identifying section 34, and a determination section 35.

As illustrated in FIG. 4, the optical receiver 3 of the third embodiment is different from the optical receiver 1 of the first embodiment in the structures of the data identifying section 34 and the determination section 35. Hereinafter, the same components are indicated with the same reference numerals and will not be explained. The optical receiver 3 of the third embodiment will be described in terms of the different structures.

The data identifying section 34 comprises a plurality of identification sections 34a corresponding to the plurality of amplifiers 13a of the pre-amplifier 13. The identification sections 34a individually identify multivalued digital data of an optical signal based on amplified electrical signals output from the respective amplifiers 13a. The identification section 34a has a predetermined critical value, and performs an identification process only when the amplified electrical signal has a value larger than or equal to the critical value. Digital data obtained by the identification process is output along with an "output enabled" signal indicating that the data is being output, to the determination section 35. On the other hand, when the amplified electrical signal has a value less than the critical value, the identification section 34a stops outputting of digital data to the determination section 35, and outputs an "output disabled" signal indicating that data is not being output, to the determination section 35, and controls the photodetector 12a and the amplifier 13a to be powered off so that operations thereof are stopped. Note that the operations continue to be stopped for a predetermined period of time (in accordance with an output cycle of an optical signal of an optical transmitter, or the like), and when the predetermined time period is elapsed, the photodetector 12a and the amplifier 13a are powered on for the next light receiving process.

The determination section 35 determines that only digital data for which an "output enabled" signal has been informed is valid data for determination among a plurality of pieces of digital data output from the plurality of identification sections 34a of the data identifying section 34, thereby determining digital data which is to be output from the optical receiver 3. With this process, a signal from a photodetector(s) 12a having a weak received light power among the plurality of photodetector 12a of the photodetector section 12 can be interrupted, resulting in a reduction in factors which cause bit error.

As described above, according to the optical receiver 3 of the third embodiment of the present invention, if the amplitude level of an electrical signal output from an amplifier 13a is low, the outputting of the electrical signal is stopped because it is determined that the electrical signal would be responsible for occurrence of bit error, and the operations of the corresponding photodetector 12a and amplifier 13a are also stopped. Thereby, the reception performance of the optical receiver 3 can be improved and the power consumption thereof can be reduced.

In the third embodiment, the case where the data identifying section 34 examines the amplitude of an output signal of the pre-amplifier 13 so as to stop the operations of a photodetector(s) 12a and an amplifier(s) 13a, has been described. Also in the second embodiment, the determination section 25 may be provided with a similar function of stopping the operations of a photodetector(s) 12a and an amplifier(s) 13a. Further, in this case, the operation of the identification section 34a may be simultaneously stopped.

Fourth Embodiment

Figure 5:
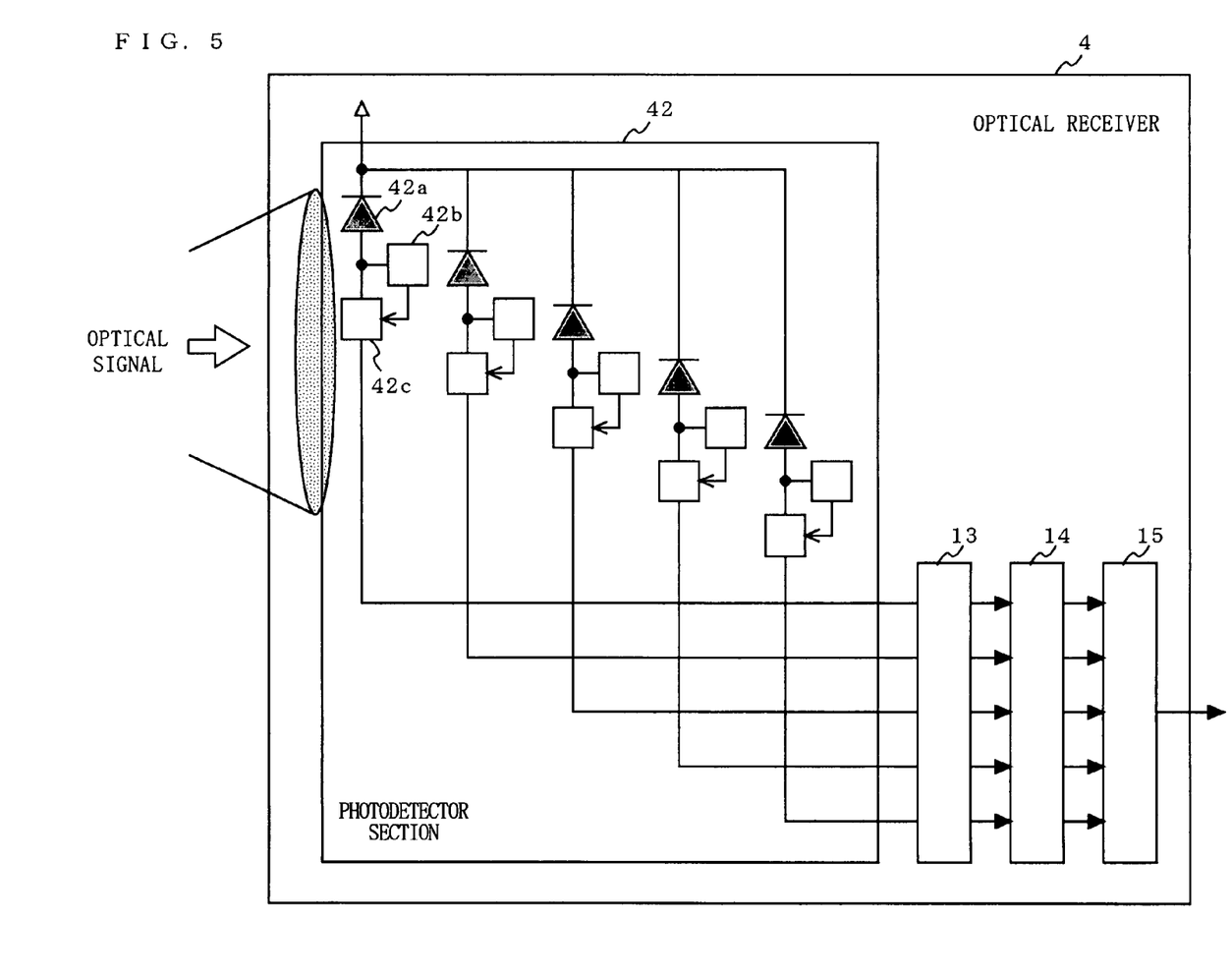
FIG. 5 is a block diagram illustrating a structure of an optical receiver 4 according to a fourth embodiment of the present invention.

FIG. 5 is a block diagram illustrating a structure of an optical receiver 4 according to a fourth embodiment of the present invention. In FIG. 5, the optical receiver 4 of the fourth embodiment comprises a photodetector section 42, a pre-amplifier 13, a data identifying section 14, and a determination section 15.

As illustrated in FIG. 5, the optical receiver 4 of the fourth embodiment is different from the optical receiver 1 of the first embodiment in the structure of the photodetector section 42. Hereinafter, the same components are indicated with the same reference numerals and will not be explained. The optical receiver 4 of the fourth embodiment will be described in terms of the different structure.

The photodetector section 42 is composed of a plurality of photodetectors 42a, and a plurality of received light power detecting sections 42b and a plurality of photodetector current output switching sections 42c corresponding to the plurality of photodetectors 42a. The photodetectors 42a individually receive and convert an optical signal into an electrical signal. Each received light power detecting section 42b detects a received light power (photodetector current) of the corresponding photodetector 42a and determines whether or not the received light power is larger than or equal to a predetermined critical value. When the received light power has a value larger than or equal to the predetermined critical value, the received light power detecting section 42b controls the photodetector current output switching section 42c so that the received light power obtained by the photodetector 42a is output to the pre-amplifier 13. On the other hand, when the received light power has a value less than the predetermined critical value, the received light power detecting section 42b controls the photodetector current output switching section 42c so that the received light power obtained by the photodetector 42a is not output to the pre-amplifier 13. The photodetector current output switching section 42c switches ON/OFF of the output operation from the photodetector 42a to the amplifier 13a in accordance with the control of the received light power detecting section 42b. In addition, the photodetector current output switching section 42c may simultaneously stop the operations of an amplifier(s) 13a and an identification section(s) 14a.

As described above, according to the optical receiver 4 according to the fourth embodiment of the present invention, the received light power of the photodetector 42a is examined so as to stop the outputting of the received light power. Thereby, it is possible to improve the reception performance of the optical receiver 4.

Next, structural examples in which the optical receivers 1 to 4 of the first to fourth embodiments are mounted on actual substrates will be described with reference to FIGS. 6 to 9.

Figure 6:
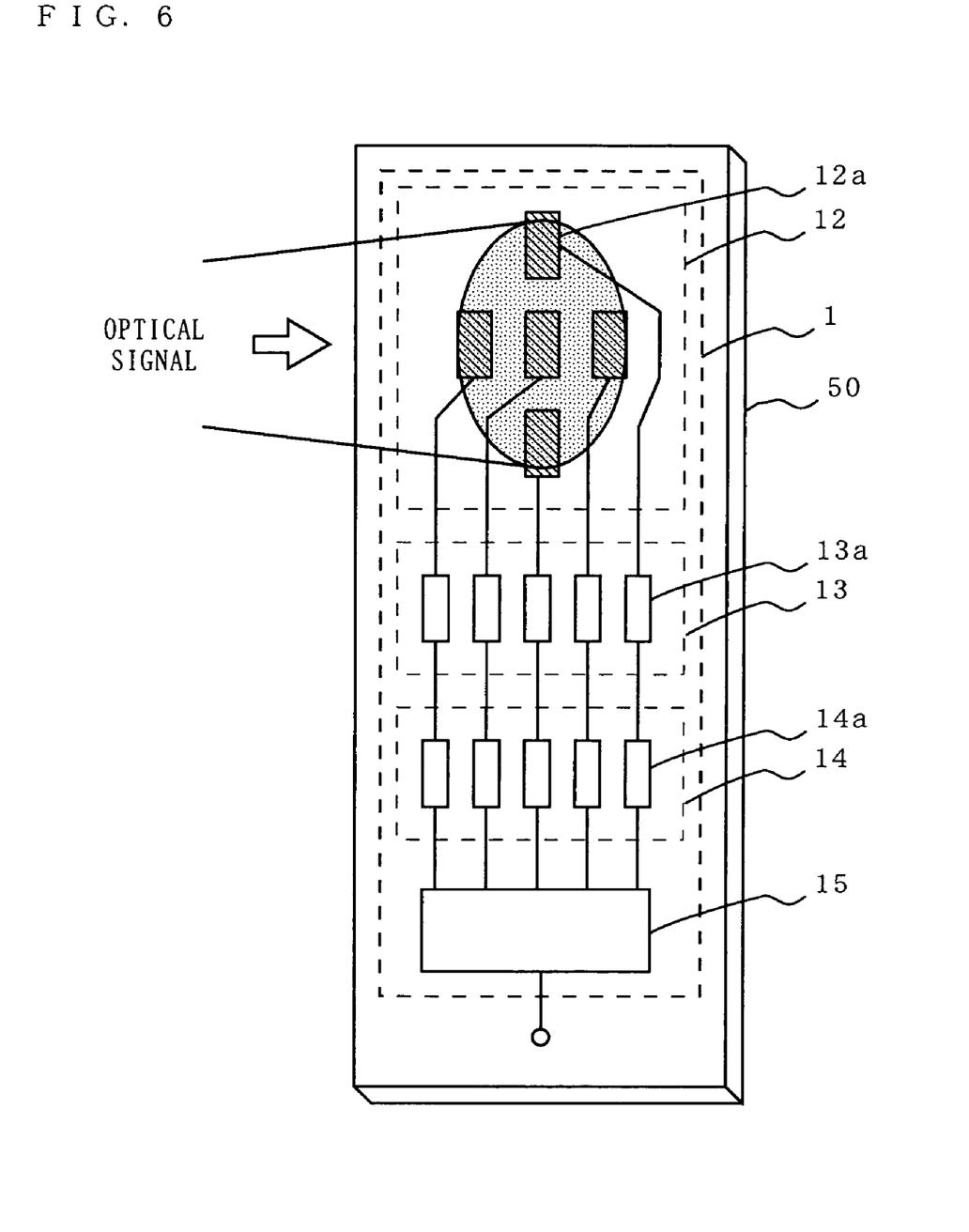
FIGS. 6 through 9 are diagrams illustrating an exemplary structure in which the optical receivers 1 to 4 of the present invention are mounted on a substrate 50.

FIG. 6 is a diagram illustrating an exemplary structure in which the optical receiver 1 of the first embodiment is mounted on a substrate 50. In this exemplary structure, five photodetectors 12a are arranged in the shape of a cross so that an optical signal having a beam profile (a hatched portion in FIG. 6) can be efficiently received.

Figure 7:
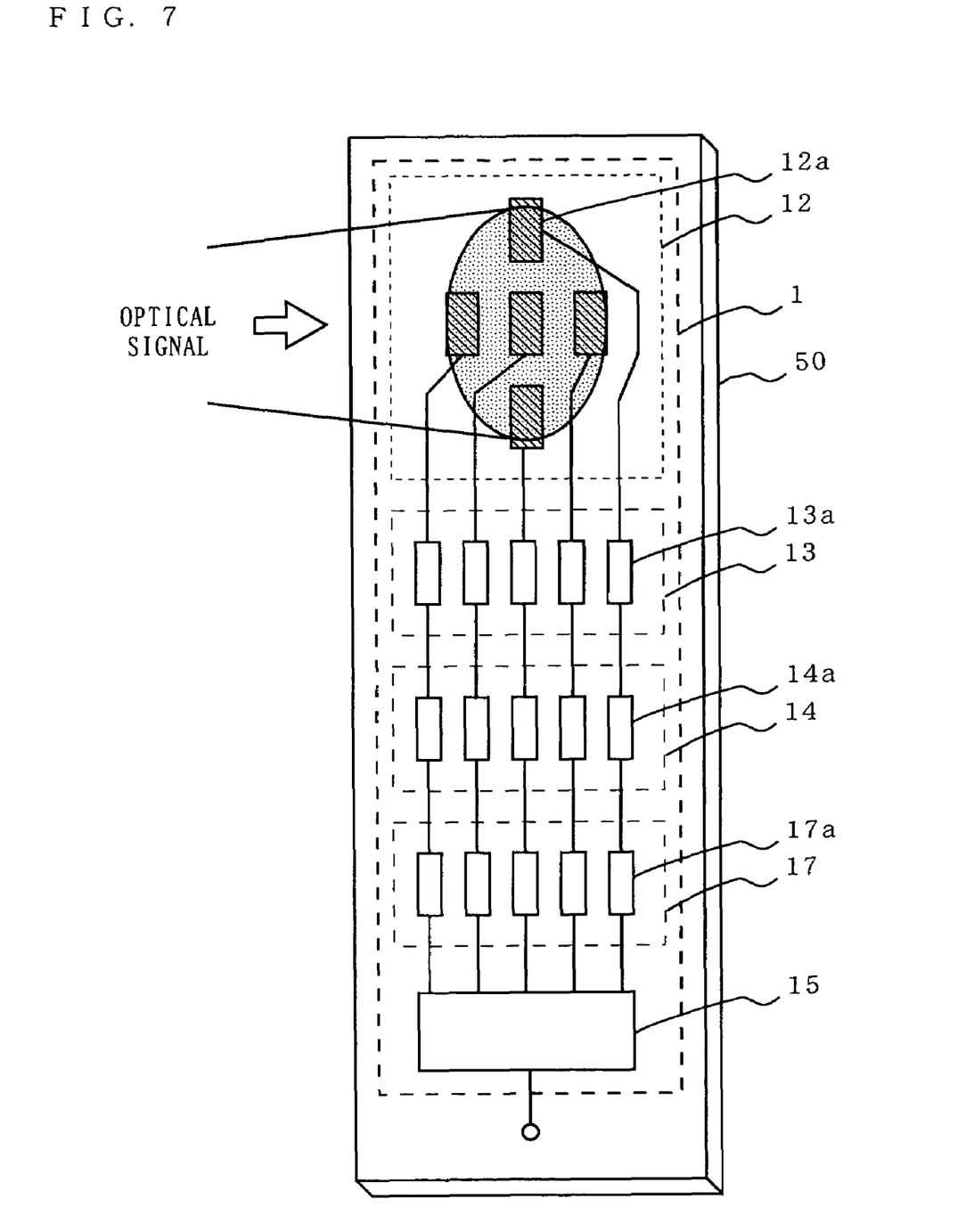

In this case, when the five photodetectors 12a are arranged in the shape of a cross as illustrated in FIG. 6, wire lengths from the photodetectors 12a to the determination section 15 are not the same. Therefore, a difference occurs in time required for a signal received by each photodetector 12a to reach the determination section 15. Therefore, as illustrated in FIG. 7, a delay section 17 composed of delay elements 17a which absorb the time difference are preferably provided between the data identifying section 14 and the determination section 15.

Figure 8:
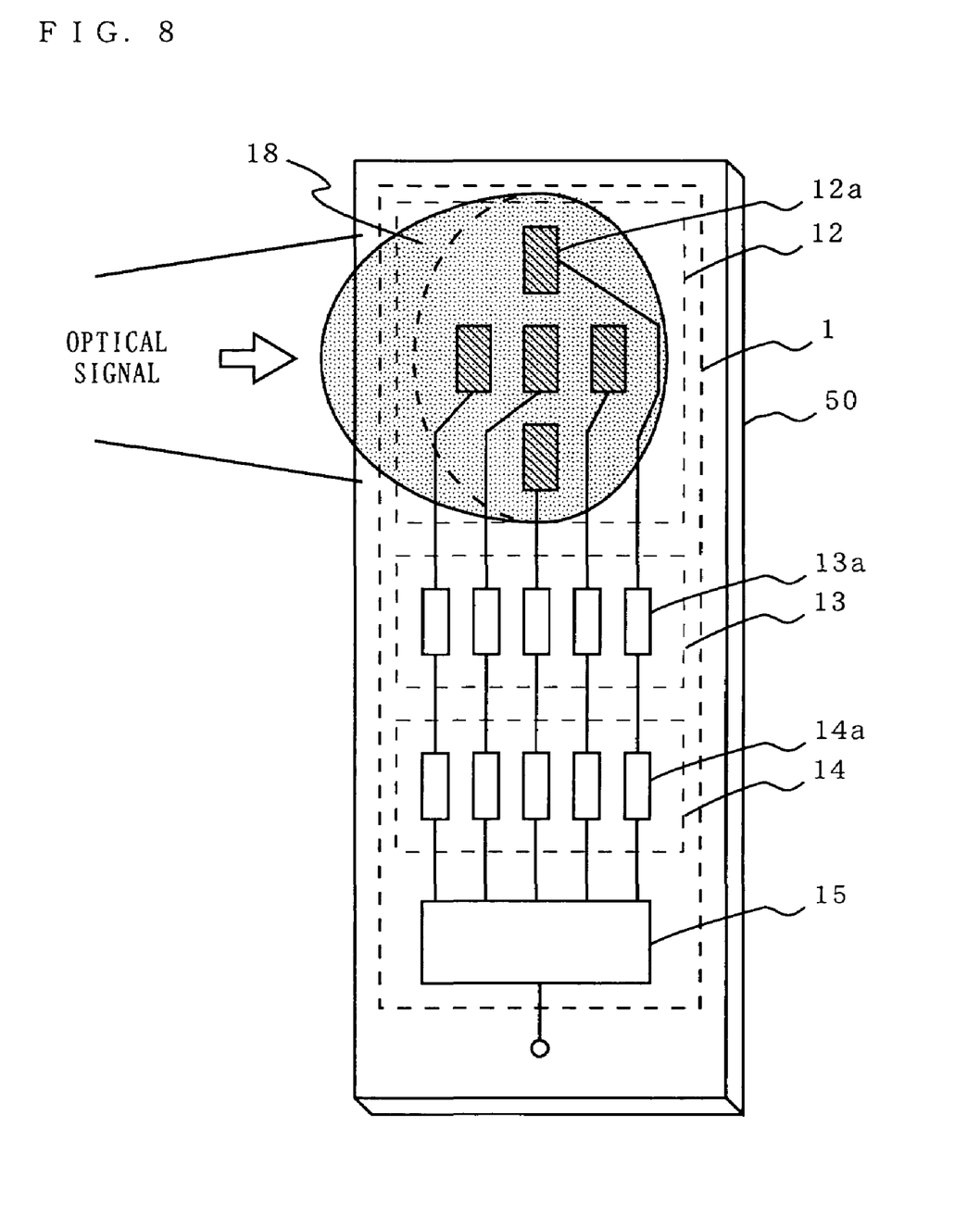

Alternatively, as illustrated in FIG. 8, a condenser lens 18 for condensing an optical signal transmitted from an optical transmitter may be provided on a light receiving side of a plurality of photodetectors 12a. With such a structure, it is possible to efficiently receive an optical signal using the plurality of photodetectors 12a.

Figure 9:
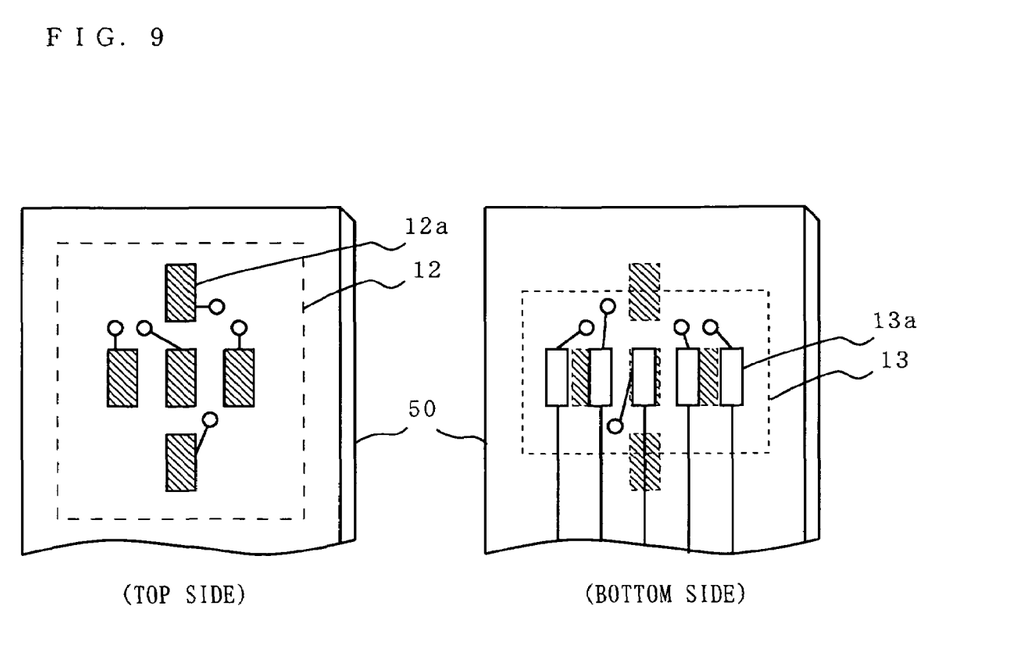

Alternatively, as illustrated in FIG. 9, if the substrate 50 has two mountable sides, a plurality of photodetectors 12a may be mounted on one side (top side), while a plurality of amplifiers 13a may be mounted on the other side (bottom side), and the plurality of photodetectors 12a and the plurality of amplifiers 13a may be connected to each other via through holes or the like.

While the invention has been described in detail, the foregoing description is in all aspects illustrative and not restrictive. It is understood that numerous other modifications and variations can be devised without departing from the scope of the invention.

The invention claimed is:

1. An optical receiver for performing communication of binary digital data using an optical signal, the optical receiver comprising:

a plurality of photodetectors for receiving the optical signal and outputting a signal;

a plurality of amplifiers, provided corresponding to the plurality of photodetectors, respectively, for amplifying signals output from the respective photodetectors;

a plurality of identification sections provided corresponding to the plurality of amplifiers, respectively, each identification section configured to output a value "1" when an amplitude of a signal output from a respective one of the plurality of photodetectors is greater than or equal to a critical value, and configured to output a value "0" when the amplitude of the signal output from the respective one of the plurality of photodetectors is less than the critical value; and a determination section for receiving a plurality of output values from the plurality of identification sections, and for determining the binary digital data based on a majority of the plurality of output values, wherein an identification section stops outputting of digital data to the determination section when an amplitude level of a signal output from a respective amplifier is smaller than a minimum value, and wherein the identification section further stops operations of the corresponding photodetector and amplifier for a predetermined time period when the amplitude level of the signal output from the respective amplifier is smaller than the minimum value.

2. An optical receiver for performing communication of binary digital data using an optical signal, the optical receiver comprising:

a plurality of photodetectors, each configured to receive the optical signal and outputting a signal;

a plurality of amplifiers, provided corresponding to the plurality of photodetectors, respectively, for amplifying signals output from the respective photodetectors;

a plurality of identification sections provided corresponding to the plurality of amplifiers, respectively, each identification section configured to output a value "1" when an amplitude of a signal output from a respective one of the plurality of photodetectors is greater than or equal to a critical value, and configured to output a value "0" when an amplitude of a signal output from a respective one of the plurality of photodetectors is less than the critical value;

a plurality of detection sections, provided corresponding to the plurality of amplifiers, respectively, for detecting amplitude levels of signals output from the respective amplifiers; and a determination section for receiving a plurality of output values from the plurality of identification sections, for providing each of the plurality of output values with a respective weighting coefficient depending on the amplitude levels detected by the plurality of detection sections, and for determining the binary digital data based on the plurality of output values and the respective weighting coefficients, wherein an identification section stops outputting of digital data to the determination section when an amplitude level of a signal output from a respective amplifier is smaller than a minimum value, and wherein the identification section further stops operations of the corresponding photodetector and amplifier for a predetermined time period when the amplitude level of the signal output from the respective amplifier is smaller than the minimum value.

3. An optical receiver for performing communication of binary digital data using an optical signal, the optical receiver comprising:

a plurality of photodetectors for receiving the optical signal and outputting a signal;

a plurality of amplifiers, provided corresponding to the plurality of photodetectors, respectively, for amplifying signals output from the respective photodetectors;

a plurality of identification sections provided corresponding to the plurality of amplifiers, respectively, each identification section configured to output a value "1" when an amplitude of a signal output from a respective one of the plurality of photodetectors is greater than or equal to a critical value, and configured to output a value "0" when the amplitude of the signal output from the respective one of the plurality of photodetectors is less than the critical value;

a determination section for receiving a plurality of output values from the plurality of identification sections, and for determining the binary digital data based on a majority of the plurality of output values;

a received light power detecting section for detecting a received light power of the photodetector; and a photodetector current output switching section for stopping outputting of the photodetector to the amplifier for a predetermined time period when the received light power detected by the received light power detecting section is smaller than a predetermined value.

4. The optical receiver according to claim 3, wherein the photodetector current output switching section further stops operations of the corresponding amplifier and identification section for a predetermined time period when the received light power detected by the received light power detecting section is smaller than the predetermined value.

5. An optical receiver for performing communication of binary digital data using an optical signal, the optical receiver comprising:

a plurality of photodetectors, each configured to receive the optical signal and outputting a signal;

a plurality of amplifiers, provided corresponding to the plurality of photodetectors, respectively, for amplifying signals output from the respective photodetectors;

a plurality of identification sections provided corresponding to the plurality of amplifiers, respectively, each identification section configured to output a value "1" when an amplitude of a signal output from a respective one of the plurality of photodetectors is greater than or equal to a critical value, and configured to output a value "0" when an amplitude of a signal output from a respective one of the plurality of photodetectors is less than the critical value;

a plurality of detection sections, provided corresponding to the plurality of amplifiers, respectively, for detecting amplitude levels of signals output from the respective amplifiers;

a determination section for receiving a plurality of output values from the plurality of identification sections, for providing each of the plurality of output values with a respective weighting coefficient depending on the amplitude levels detected by the plurality of detection sections, and for determining the binary digital data based on the plurality of output values and the respective weighting coefficients;

a received light power detecting section for detecting a received light power of the photodetector; and a photodetector current output switching section for stopping outputting of the photodetector to the amplifier for a predetermined time period when the received light power detected by the received light power detecting section is smaller than a predetermined value.

6. The optical receiver according to claim 5, wherein the photodetector current output switching section further stops operations of the corresponding amplifier and identification section for a predetermined time period when the received light power detected by the received light power detecting section is smaller than the predetermined value.

\* \* \* \* \*